United States Patent [19]

Trotter et al.

[11] Patent Number: 4,480,087

[45] Date of Patent: Oct. 30, 1984

[54] POLYESTER WAXES BASED ON ALKYLSUCCINIC ANHYDRIDE OR ALKENYLSUCCINIC ANHYDRIDE

[75] Inventors: Jimmy R. Trotter; Frederick B. Joyner; Richard L. McConnell, all of Kingsport, Tenn.

[73] Assignee: Eastman Kodak Company, Rochester, N.Y.

[21] Appl. No.: 509,534

[22] Filed: Jun. 30, 1983

[51] Int. Cl.$^3$ .............................................. C08G 63/16
[52] U.S. Cl. ................................ 528/302; 260/410.6; 528/272; 528/303; 560/193; 560/198
[58] Field of Search ............... 528/272; 528/302–303; 560/90, 193, 198; 260/410.6

[56] References Cited

U.S. PATENT DOCUMENTS

| | | | |
|---|---|---|---|
| 3,076,787 | 2/1963 | Johnson et al. | 560/90 X |
| 3,249,615 | 5/1966 | Ackermann | 528/302 X |
| 3,590,076 | 6/1971 | Heintzelman et al. | 560/198 |
| 3,699,154 | 10/1972 | Heintzelman et al. | 560/193 X |
| 3,704,255 | 11/1972 | Braun | 528/302 X |
| 4,039,560 | 8/1977 | Tomoshige | 560/198 X |

Primary Examiner—Lucille M. Phynes
Attorney, Agent, or Firm—Clyde L. Tootle; Daniel B. Reece, III

[57] ABSTRACT

This invention relates to new linear polyester waxes which contain as the acid member at least 75 mole percent alkylsuccinic anhydride or alkenylsuccinic anhydride. The polyester waxes may be viscous oils or amorphous or semicrystalline solids with melting points less than about 100° C. These polyester waxes are useful as modifiers for ethylene/vinyl acetate copolymer based adhesives and as additives to improve the hardness of polyolefin coatings.

19 Claims, No Drawings

POLYESTER WAXES BASED ON ALKYLSUCCINIC ANHYDRIDE OR ALKENYLSUCCINIC ANHYDRIDE

DESCRIPTION

This invention relates to new linear polyester waxes which contain as the acid member at least about 75 mol percent of at least one semicrystalline alkylsuccinic anhydride or alkenylsuccinic anhydride. The polyester waxes may be viscous oils, amorphous solids, or semicrystalline solids with melting points less than about 100° C. These polyester waxes are useful as wax modifiers for ethylene/vinyl acetate (EVA) copolymer based adhesives, paraffin waxes, polyethylene wax, and the like.

Heretofore, naturally occurring waxes have been used for a very long time in industry. For example, petroleum waxes (paraffin, microcrystalline wax), animal waxes (beeswax, spermaceti, and lanolin), mineral waxes (montan and ozokerite), and vegetable waxes (bayberry, carnauba, Japan, candelilla, ouricury, and rice bran) are commonly used in such applications as candles, cosmetics, inks, carbon paper, crayons, rubber products, and lubricants. However, these naturally occurring waxes are in limited supply and are not always available, and when they are available they can be expensive. Also, they are very low in molecular weight and have melt viscosities of less than about 25 centipoise at 190° C., which are not desirable for some applications.

According to the present invention, it has now been found that new and useful polyester waxes with narrow molecular weight distributions and with melting points up to about 100° C. can readily be prepared. This broad range of melting points is not available from conventional waxes. It is also possible to vary the molecular weight of these waxes and to provide waxes with different rheological characteristics. Thus, polymers with wax-like properties can be prepared which have inherent viscosities in the range from about 0.05 to about 0.39, a heat of fusion of from 0 to about 20 cal./g., and a melt viscosity of about 10 to 2000 cp. at 190° C., preferably about 15 to 1000 cp. at 190° C., most preferred 25 to 750 cp. at 190° C. These new waxes are useful as modifiers for EVA copolymer based adhesives and natural and synthetic waxes.

These new polyester waxes may be viscous oils at ambient temperatures, amorphous solids or they may be semicrystalline solids with crystalline melting points less than 100° C., preferably about 50°–90° C. They contain as the acid member at least 75 mol percent of at least one alkylsuccinic anhydride or alkenylsuccinic anhydride or a mixture thereof. Alkylsuccinic anhydrides or alkenylsuccinic anhydrides useful in the present invention are, for example, those containing alkyl or alkenyl groups containing 8 to 20 carbon atoms. Such alkylsuccinic anhydrides or alkenylsuccinic anhydrides are, for example, octylsuccinic anhydride, decylsuccinic anhydride, dodecylsuccinic anhydride, tetradecylsuccinic anhydride, hexadecylsuccinic anhydride, octadecylsuccinic anhydride, eicosylsuccinic anhydride, docosylsuccinic anhydride, triacontylsuccinic anhydride, iso-octadecylsuccinic anhydride, octenylsuccinic anhydride, nonenylsuccinic anhydride, decenylsuccinic anhydride, dodecenylsuccinic anhydride, tetradecenylsuccinic anhydride, hexadecenylsuccinic anhydride, octadecenylsuccinic anhydride, iso-octadecenylsuccinic anhydride, eicosenylsuccinic anhydride, docosenylsuccinic anhydride, and the like.

The remaining acid member may be a $C_4$ to $C_{10}$ dibasic aliphatic acid such as, for example, adipic, succinic, glutaric and sebacic acid. The polyesters of this invention also contain one or more selected aliphatic or cycloaliphatic glycols. Useful glycols include ethylene glycol, 1,3-propanediol, propylene glycol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol, diethylene glycol, poly(oxyethylene)glycol, and the like.

These new polyester and copolyester waxes are readily prepared using typical polycondensation reaction conditions. They may be prepared either by batch or continuous processes based on esterification or transesterification reactions well known in the art.

Typical polyesterification catalysts which may be used include titanium alkoxides, dibutyltin dilaurate, and combinations of zinc, manganese, or magnesium acetates or benzoates with antimony oxides or antimony triacetate.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 88.0 grams (0.25 mole) of octadecylsuccinic anhydride, 23.25 grams (0.375 mole) of ethylene glycol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200°–210° C. in a Belmont metal bath for two hours with a nitrogen sweep over the reaction mixture. When the theoretical amount of water has distilled from the reaction mixture, the metal bath temperature is increased to 240° C. and the pressure in the flask is reduced to about 0.1 mm of mercury. The flask is heated at 240° C. at reduced pressure for 30 minutes. The flask is then removed from the metal bath and is allowed to cool under a nitrogen atmosphere as the polymer solidifies.

The poly(ethylene octadecylsuccinate) is an opaque, cream color. The polymer has a number average molecular weight ($M_n$) of 3323, a Thermosel melt viscosity of 44 cp at 125° C., and a penetration hardness value of 4 at 23° C. (by ASTM D5 method). By DSC analysis, the polymer has a melting point ($T_m$) of 50° C. [heat of fusion ($\Delta H_f$) value of 17.1 cal/g].

When melt blended at 175° C. at the 10 wt. percent level with various waxes and resins, the polyester wax is compatible in the melt with Epolene C-10 low molecular weight polyethylene and with Elvax 220 EVA copolymer.

A melt blend is made at 177° C. in a glass flask using 35 g of Elvax 220 copolymer (EVA copolymer containing 28 wt. percent vinyl acetate; melt index 150), 30 g of Foral 105 rosin ester tackifying resin (ring and ball softening point 105° C.), 25 g of 150° F. microcrystalline wax, and 10 g of poly(ethylene octadecylsuccinate) wax. A ⅛ inch molten bead of this blend is applied at 175° C. to a piece of corrugated board and this piece of corrugated board is quickly laminated to another piece of corrugated board. A fiber tearing bond is obtained with this adhesive mixture in about two seconds compression time.

EXAMPLE 2

About 88.0 grams (0.25 mole) of octadecylsuccinic anhydride, 33.75 grams (0.375 mole) of 1,4-butanediol, and 100 ppm of titanium catalyst (titanium isopropoxide in n-butanol) are weighed into a 500 mL single-neck round-bottom flask equipped with a nitrogen inlet, a stirrer, a vacuum outlet, and a condensing flask. The flask is heated to 200°–210° C. in a Belmont metal bath for two hours with a nitrogen sweep over the reaction mixture. When the theoretical amount of water has distilled from the reaction mixture, the metal bath temperature is increased to 250° C. and the pressure in the flask is reduced to about 0.1 mm of mercury. The flask is heated at 250° C. at reduced pressure for 45 minutes. The flask is then removed from the metal bath and is allowed to cool under a nitrogen atmosphere as the polymer solidifies.

The poly(butylene octadecylsuccinate) is an opaque, cream color. The polymer has a Thermosel melt viscosity of 25 cp at 190° C., and a penetration hardness value of 21 (by ASTM D5 method). By DSC analysis, the polymer has a melting point ($T_m$) of 39° C. [heat of fusion ($\Delta H_f$) value of 13.6 cal/g].

When melt blended at 177° C. at the 10 wt. percent level, the polyester wax is compatible in the melt with Epolene C-10 low molecular weight polyethylene and with Elvax 220 EVA copolymer.

EXAMPLE 3

About 88.0 grams (0.25 mole) of octadecylsuccinic anhydride, 44.25 grams (0.375 mole) of 1,6-hexanediol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200°–210° C. in a Belmont metal bath for two hours with a nitrogen sweep over the reaction mixture. When the theoretical amount of water has distilled from the reaction mixture, the metal bath temperature is increased to 240° C. and the pressure in the flask is reduced to about 0.1 mm of mercury. The flask is heated at 240° C. at reduced pressure for 30 minutes. The flask is then removed from the metal bath and is allowed to cool under a nitrogen atmosphere as the polymer solidifies.

The poly(hexamethylene octadecylsuccinate) is an opaque, white color. The polymer has a Thermosel melt viscosity of 88 cp at 125° C. By DSC analysis, the polymer has a melting point ($T_m$) of 29° C.

EXAMPLE 4

About 88.0 grams (0.25 mole) of octadecylsuccinic anhydride, 46.8 grams (0.325 mole) of 1,4-cyclohexanedimethanol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200°–210° C. in a Belmont metal bath for two hours with a nitrogen sweep over the reaction mixture. When the theoretical amount of water has distilled from the reaction mixture, the metal bath temperature is increased to 240° C. and the pressure in the flask is reduced to about 0.1 mm of mercury. The flask is heated at 240° C. at reduced pressure for 30 minutes. The flask is then removed from the metal bath and the polymer is allowed to cool under a nitrogen atmosphere.

The poly(1,4-cyclohexylenedimethylene octadecylsuccinate) is a clear, light colored liquid. The polymer has a Thermosel melt viscosity of 181 cp at 190° C.

EXAMPLE 5

About 88.0 grams (0.25 mole) of octadecylsuccinic anhydride, 39.0 grams (0.375 mole) of neopentyl glycol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200°–210° C. in a Belmont metal bath for two hours with a nitrogen sweep over the reaction mixture. When the theoretical amount of water has distilled from the reaction mixture, the metal bath temperature is increased to 250° C. and the pressure in the flask is reduced to about 0.1 mm of mercury. The flask is heated at 250° C. at reduced pressure for 30 minutes. The flask is then removed from the metal bath and is allowed to cool under a nitrogen atmosphere as the polymer cools.

The poly(2,2-dimethyltrimethylene octadecylsuccinate) is an opaque, white viscous liquid.

When melt blended at 177° C. at the 10 wt. percent level, the polyester wax is compatible in the melt with Epolene C-10 low molecular weight polyethylene, carnauba wax and with Elvax 220 EVA copolymer.

EXAMPLE 6

About 24.25 grams (0.125 mole) of dimethyl terephthalate, 132.0 grams (0.375 mole) of octadecylsuccinic anhydride, 67.5 grams (0.75 mole) of 1,4-butanediol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200° C. in a Belmont metal bath for one hour with a nitrogen sweep over the reaction mixture. The temperature of the metal bath is then increased to 210° C. for one hour. When the theoretical amount of methanol and water has distilled from the reaction mixture, the metal bath temperature is increased to 250° C. and the pressure in the flask is reduced to about 0.1 mm of mercury. The flask is heated at 250° C. at reduced pressure for 20 minutes. The flask is then removed from the metal bath and is allowed to cool under a nitrogen atmosphere as the polymer solidifies. NMR analysis indicates that the polymer is a poly(butylene octadecylsuccinate) copolyester containing 32 mole percent terephthalic acid moiety (poly[butylene 32-terephthalate-co-68 octadecylsuccinate]).

The polyester wax is an opaque, cream color. The wax has a Thermosel melt viscosity of 700 cp at 190° C., and a penetration hardness value of 2 (by ASTM D5 method). By DSC analysis, the wax has a melting point ($T_m$) of 59° C. [heat of fusion ($\Delta H_f$) value of 16.1 cal/g].

When melt blended at 177° C. at the 10 wt. percent level, this copolyester wax is incompatible in the melt with low molecular weight polyethylene wax, paraffin wax, carnauba wax and with EVA copolymer.

This example shows that copolyester waxes containing an aromatic moiety are not compatible with waxes such as ethylene containing waxes.

EXAMPLE 7

About 176.0 grams (0.5 mole) of octadecylsuccinic anhydride, 82.8 grams (0.92 mole) of 1,4-butanediol, 9.44 grams (0.08 mole) of 1,6-hexanediol, and 100 ppm of titanium catalyst (titanium isopropoxide in n-butanol) are placed into a 500-ml single-neck, round bottom flask equipped with a nitrogen inlet, a stirrer, a vacuum outlet, and a condensing flask. The flask is heated to 200° C. in a metal bath for one hour with a nitrogen sweep over the reaction mixture. Then the temperature of the metal bath is increased to 210° C. for one hour. When the theoretical amount of water has distilled from the reaction mixture, the metal bath temperature is increased to 250° C. and the pressure in the flask is reduced to about 0.1 mm of mercury. The flask is heated at 250° C. at reduced pressure for 30 minutes. The flask is then removed from the bath and is allowed to cool under a nitrogen atmosphere as the polymer solidifies. By NMR analysis the polymer is a poly(butylene octadecylsuccinate) copolyester containing 10 mol percent of the 1,6-hexanediol moiety. The polymer has an I.V. of 0.27. By DSC analysis, the polymer has a melting point of 51° C. [heat of fusion ($\Delta H_f$) is 10.5 cal./g.].

EXAMPLE 8

About 167.2 grams (0.475 mole) of octadecylsuccinic anhydride, 4.35 grams (0.025 mole) of dimethyl adipate, 62 grams (1.0 mole) of ethylene glycol, and 100 ppm of titanium catalyst (titanium isopropoxide in n-butanol) are placed into a 500-ml single-neck, round bottom flask equipped with a nitrogen inlet, a stirrer, a vacuum outlet, and a condensing flask. The flask is heated to 200° C. in a metal bath for one hour with a nitrogen sweep over the reaction mixture. Then the temperature of the metal bath is increased to 210° C. for one hour. When the theoretical amount of water and methanol is distilled from the reaction mixture, the metal bath temperature is increased to 250° C. and the pressure in the flask is reduced to about 0.1 mm of mercury. The flask is heated at 250° C. at reduced pressure for 30 minutes. The flask is then removed from the bath and is allowed to cool under a nitrogen atmosphere as the polymer solidifies. By NMR analysis the polymer is a poly(ethylene octadecylsuccinate) containing 5 mol percent of adipic acid moiety. The polymer has an I.V. of 0.18. By DSC analysis, the polymer has a melting point of 76° C. [heat of fusion ($\Delta H_f$) is 16.5 cal./g.].

EXAMPLE 9

About 132.0 grams (0.375 mole) of octadecylsuccinic anhydride, 25.25 grams (0.125 mole) of sebacic acid, 62 grams (1.0 mole) of ethylene glycol, and 100 ppm of titanium catalyst (titanium isopropoxide in n-butanol) are placed into a 500-ml single-neck, round bottom flask equipped with a nitrogen inlet, a stirrer, a vacuum outlet, and a condensing flask. The flask is heated to 200° C. in a metal bath for one hour with a nitrogen sweep over the reaction mixture. Then the temperature of the metal bath is increased to 210° C. for one hour. When the theoretical amount of water is distilled from the reaction mixture, the metal bath temperature is increased to 250° C. and the pressure in the flask is reduced to about 0.1 mm of mercury. The flask is heated at 250° C. at reduced pressure for 15 minutes. The flask is then removed from the bath and is allowed to cool under a nitrogen atmosphere as the polymer solidifies. By NMR analysis the polymer is a poly(ethylene octadecylsuccinate) containing 25 mol percent of sebacic acid moiety. The polymer has an I.V. of 0.31. By DSC analysis, the polymer has a melting point of 47° C. [heat of fusion ($\Delta H_f$) is 6.1 cal./g.].

EXAMPLE 10

About 87.75 grams (0.25 mole) of octadecenylsuccinic anhydride, 23.25 grams (0.375 mole) of ethylene glycol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200°-210° C. in a Belmont metal bath for two hours with a nitrogen sweep over the reaction mixture. When the theoretical amount of water has distilled from the reaction mixture, the metal bath temperature is increased to 250° C. and the pressure in the flask is reduced to about 0.1 mm of mercury. The flask is heated at 250° C. at reduced pressure for 30 minutes. The flask is then removed from the metal bath and is allowed to cool under a nitrogen atmosphere as the polymer solidifies.

The poly(ethylene octadecenylsuccinate) is an opaque, cream-color. The polymer has a Thermosel melt viscosity of 63 cp at 125° C., and a penetration hardness value of 9 at 23° C. (by ASTM D5 method). By DSC analysis, the polymer has a melting point ($T_m$) of 34° C. [heat of fusion ($\Delta H_f$) value of 16.5 cal/g].

When melt blended at 175° C. at the 10 wt. percent level with various waxes and resins, the polyester wax is compatible in the melt with Epolene C-10 low molecular weight polyethylene, with Elvax 220 EVA copolymer, and with 130° F. paraffin.

EXAMPLE 11

About 53.0 grams (0.25 mole) of octylsuccinic anhydride, 23.25 grams (0.375 mole) of ethylene glycol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200°-210° C. in a Belmont metal bath for two hours with a nitrogen sweep over the reaction mixture. When the theoretical amount of water has distilled from the reaction mixture, the metal bath temperature is increased to 240° C. and the pressure in the flask is reduced to about 0.1 mm of mercury. The flask is heated at 240° C. at reduced pressure for 30 minutes. The flask is then removed from the metal bath and the polymer is allowed to cool under a nitrogen atmosphere.

The poly(ethylene octylsuccinate) is a clear, white viscous liquid. The polymer has a number average molecular weight ($M_n$) of 4224 and a Thermosel melt viscosity of 138 cp at 125° C.

When melt blended at 175° C. at the 10 wt. percent level with various waxes and resins, the polyester wax is compatible in the melt with Epolene C-10 low molecular weight polyethylene, with carnauba wax, and with Elvax 220 EVA copolymer.

EXAMPLE 12

About 67.0 grams (0.25 mole) of dodecylsuccinic anhydride, 23.25 grams (0.375 mole) of ethylene glycol, and 100 ppm of titanium catalyst (titanium isopropoxide in n-butanol) are weighed into a 500-mL single-neck round-bottom flask equipped with a nitrogen inlet, a stirrer, a vacuum outlet, and a condensing flask. The flask is heated to 200°–210° C. in a Belmont metal bath for two hours with a nitrogen sweep over the reaction mixture. When the theoretical amount of water has distilled from the reaction mixture, the metal bath temperature is increased to 240° C. and the pressure in the flask is reduced to about 0.1 mm of mercury. The flask is heated at 240° C. at reduced pressure for 30 minutes. The flask is then removed from the metal bath and the polymer is allowed to cool under a nitrogen atmosphere.

The poly(ethylene dodecylsuccinate) is a clear, white viscous liquid. The polymer has a number average molecular weight ($M_n$) of 4661 and a Thermosel melt viscosity of 75 cp at 125° C.

When melt blended at 175° C. at the 10 wt. percent level with various waxes and resins, the polyester wax is compatible in the melt with Epolene C-10 low molecular weight polyethylene, with Elvax 220 EVA copolymer, and with 130° F. paraffin.

The polyester waxes of this invention when blended with polyolefins provide coating compositions for coating substrates such as kraft paper, milk carton stock, photographic papers, cellulosic sheets, primed metal foils such as aluminum and the like. These polyester waxes can also be blended with EVA copolymers to form adhesives. The coated substrates and adhesives find utility in food packaging, drug and medicine packing and other well known uses.

The invention has been described in detail with particular reference to preferred embodiments thereof, but it will be understood that variations and modifications can be effected within the spirit and scope of the invention.

We claim:

1. A linear polyester wax composition having a melting point less than about 100° C., an inherent viscosity of from about 0.05 to about 0.39, a heat of fusion of from 0 to about 20 cal./g., and a melt viscosity of about 10 cp. to about 2000 cp. at 190° C. containing as the acid member at least about 75 mole percent alkylsuccinic anhydride or alkenylsuccinic anhydride, and the acid functioning derivatives thereof, and linear aliphatic and cycloaliphatic glycols having 2 to 10 carbon atoms as the diol member.

2. A linear polyester wax composition according to claim 1 wherein said alkylsuccinic anhydride is octylsuccinic anhydride.

3. A linear polyester wax composition according to claim 2 wherein said aliphatic glycol is ethylene glycol.

4. A linear polyester wax composition according to claim 2 wherein said aliphatic glycol is 1,4-butanediol.

5. A linear polyester wax composition according to claim 2 wherein said aliphatic glycol is 1,6-hexanediol.

6. A linear polyester wax composition according to claim 2 wherein said cycloaliphatic glycol is 1,4-cyclohexanedimethanol.

7. A linear polyester wax composition according to claim 1 wherein said alkylsuccinic anhydride is octadecylsuccinic anhydride.

8. A linear polyester wax composition according to claim 7 wherein said aliphatic glycol is 1,4-butanediol.

9. A linear polyester wax composition according to claim 7 wherein said aliphatic glycol is neopentyl glycol.

10. A linear polyester wax composition according to claim 7 wherein said cycloaliphatic glycol is 1,4-cyclohexanedimethanol.

11. A linear polyester wax composition according to claim 1 wherein said alkenylsuccinic anhydride is octadecenylsuccinic anhydride.

12. A linear polyester wax composition according to claim 11 wherein said aliphatic glycol is ethylene glycol.

13. A linear polyester wax composition according to claim 11 wherein said aliphatic glycol is 1,4-butanediol.

14. A linear polyester wax composition according to claim 11 wherein said aliphatic glycol is 1,6-hexanediol.

15. A linear polyester wax composition according to claim 11 wherein said cycloaliphatic glycol is 1,4-cyclohexanedimethanol.

16. A linear polyester wax composition according to claim 1 wherein said alkylsuccinic anhydride is octadecylsuccinic anhydride.

17. A linear polyester wax composition according to claim 16 wherein said aliphatic glycol is 1,4-butanediol.

18. A linear polyester wax composition according to claim 16 wherein said aliphatic glycol is neopentyl glycol.

19. A linear polyester wax composition according to claim 16 wherein said cycloaliphatic glycol is 1,4-cyclohexanedimethanol.

* * * * *